United States Patent [19]
McOnie

[11] Patent Number: 5,403,020
[45] Date of Patent: Apr. 4, 1995

[54] SPLIT-RING SEAL

[75] Inventor: Robert McOnie, Kenner, La.

[73] Assignee: Slurry Dynamics Inc., Kenner, La.

[21] Appl. No.: 67,685

[22] Filed: May 25, 1993

Related U.S. Application Data

[63] Continuation of Ser. No. 628,372, Dec. 17, 1990, abandoned.

[51] Int. Cl.$^6$ .................................. F16J 15/38
[52] U.S. Cl. .............................. 277/81 S; 277/92; 277/94; 277/136
[58] Field of Search ............ 277/81 S, 94, 92, 81 R, 277/136

[56] References Cited

U.S. PATENT DOCUMENTS

| | | | |
|---|---|---|---|
| 2,395,095 | 2/1946 | Brady, Jr. | 277/92 |
| 2,828,983 | 4/1958 | Hunt | 277/81 S |
| 2,994,547 | 8/1961 | Dolhun | 277/92 |
| 3,024,048 | 3/1962 | Kobert | 277/92 |
| 3,025,070 | 3/1962 | Copes | 277/81 S |
| 3,269,738 | 8/1966 | Baumler et al. | 277/92 |
| 3,291,493 | 12/1966 | Blair | 277/92 |
| 3,447,810 | 6/1969 | Porter | 277/92 |
| 4,275,889 | 6/1981 | Butler | 277/88 |
| 4,576,384 | 3/1986 | Azibert | 277/81 S |
| 4,779,876 | 10/1988 | Novosad | 277/815 |

Primary Examiner—William A. Cuchlinski, Jr.
Assistant Examiner—Daniel G. DePumpo
Attorney, Agent, or Firm—Keaty & Keaty

[57] ABSTRACT

The invention relates to a split seal device for use between a stationary body and a rotary body. The device utilizes a fractured seal ring which is fractured along two diametrically opposite uneven fracture lines to prevent leakage of fluid. A vulcanized rubber insert which circumferentially engages the outer surface of the split ring is cut along about at least one split line and is fitted within a rotary housing, the latter being designed for mounting on a rotating shaft. The fractured split ring has a contact face for frictional contact with a corresponding contact face of a seal ring of the stationary body. The seal ring is likewise fractured along two diametrically opposite uneven fracture lines and is retained adjacent innermost end of the stationary body. To decrease shock of rotation, the lugs which engage the rotary face to the rotary housing, are made flexible and resilient. The split seal device is mounted for engagement with the flexible lugs in general co-axial alignment with the rotating body. The stationary portion has a two-part flange which is fixedly removably attached to a fluid containing vessel. An elastomeric insert is inserted between two parts of the flange.

25 Claims, 2 Drawing Sheets

SPLIT-RING SEAL

This is a continuation of application Ser. No. 628,372, filed Dec. 17, 1990, now abandoned.

BACKGROUND OF THE INVENTION

The invention relates to seals for use with rotational equipment, such as pumps, mixers and the like.

In most commonly available rotating equipment a seal is used for positioning between a stationary and a rotary portion, so as to prevent leakage of the fluids being pump, mixed, etc.

The seals are exposed to a considerable degree of friction, which leads to wearing of the seals to a condition where it has to be replaced. To achieve this purpose, the equipment has to be disconnected from the driving motors and skilled mechanics are called to replace the damaged or worn out seal. Such interruption of process leads to the loss of valuable time and labor. To eliminate such problems, a split seal was suggested to be used for use between a rotary and the stationary parts, the former being assembled around the rotating shaft and locked into position. An example of the use of such split seal is found in a seal manufactured by A. W. Chesterton Company of Stoneham, Mass. and available under the brand name of Chesterton 221 Split Seal.

However, the seal of A. W. Chesterton Company has a plurality of parts, each of which is subject to excessive wear and therefore damage, requiring often change of the split seal and therefore loss of valuable production time. Besides, the area of connection of two semi-circular parts is not entirely leak proof, since the connecting surfaces are flat and machine-polished before fitted and matched together.

The present invention contemplates elimination of the disadvantages associated with the known art and provision of a split seal which is simple and easy to manufacture and has a minimum parts which could be subject to breakage or damage.

SUMMARY OF THE INVENTION

The present invention achieves its objects by provision of a split, seal ring device for use in combination with a rotary and a stationary portion. The rotary assembly comprises a rotary body, or housing which accommodates at least a portion of a fractured seal ring and a flexible insert fittingly engaged between the rotary housing and the fractured seal ring. The fractured seal ring is fractured along two diametrically opposite uneven fracture lines, which are used instead of machined smooth surfaces of conventional seal ring faces, thus avoiding the use of bolts or other mechanical securing elements to secure two semi-circular portions of the seal ring. The flexible insert is also split along at least one split line and, when being removed, is hinged at a point opposite the split line, after the ends of the flexible insert, that are immediately adjacent the split line, are freed from engagement between the fractured seal ring and the rotary housing.

The stationary portion comprises a two-part flange, an elastomeric insert fitted between the flange parts, and a seal ring, the latter having a contact surface for contacting a contact face of the rotating fractured seal ring. The flange parts are bolted together and removably engaged with a fluid containing vessel.

It is therefore an object of the present invention to provide a split seal device for use between a rotationary body and a stationary body.

It is another object of the present invention to provide a split seal device which is inexpensive and easy to manufacture.

It is a further object of the present invention to provide a seal ring seal device which has minimum parts which could be subject to breakage or damage.

These and other objects of the present invention will be more apparent to those skilled in the art from the following detail description of the invention.

BRIEF DESCRIPTION OF THE DRAWINGS

Reference will now be made to the drawings, wherein like parts are designated by like numerals, and wherein:

FIG. 3 is a detail end view of the fractured split ring and flexible insert in accordance with the present invention.

DETAILED DESCRIPTION OF THE PREFERRED EMBODIMENT

Figure 1:
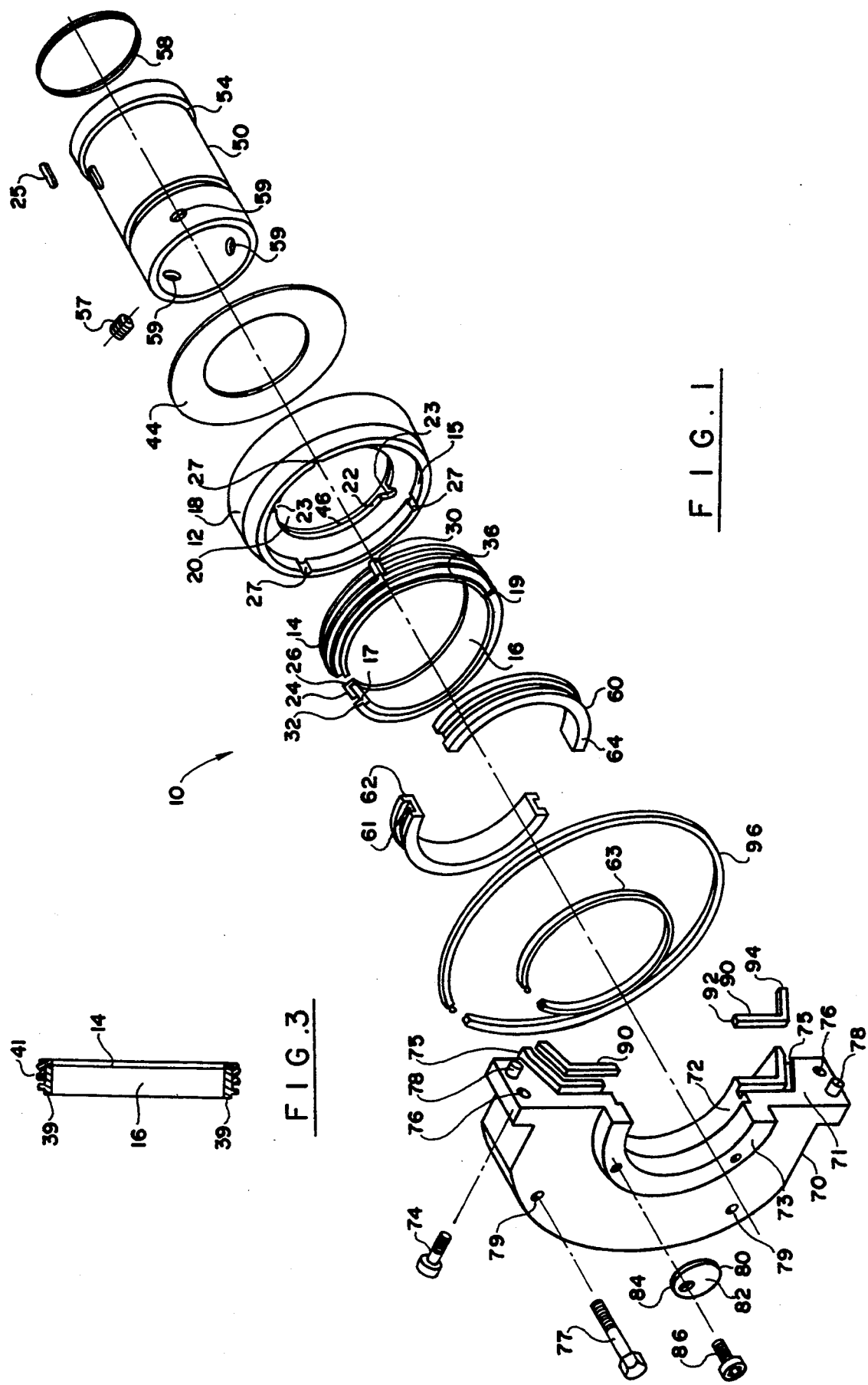
FIG. 1 is an exploded view of the seal device in accordance with the present invention.

Referring now to the drawings in more detail, the split seal of the present invention is designated by numeral 10. The split seal comprises an annular rotary body (rotary housing) 12, within which is mounted an elastomeric split rotary face cup or insert 14 which, in turn, is fitted between the rotary body 12 and a split rotary face 16.

The rotary body 12 has an outer lateral portion 18 and an inwardly extending integral web of a reduced diameter 22, extending at a right angle to the portion 18, towards a central opening 20, which is engaged about a rotating sleeve 50. The web 22 has two notches 23 located at diametrically opposite circumferential areas. The two notches 23 fit about two drive keys 25 (only one is shown in FIG. 1). A part of each drive key 25 is engaged in apertures 52 formed in a drive sleeve 50. The drive keys 25 are engaged within the notches 23 and transmit the rotary force from the seal sleeve 50 to the rotary housing, or body 12.

A plurality of grooves 27 are machined in the part 18 of the rotary housing 12 and extend radially, to some distance, towards the outer periphery of the rotary housing 12.

Drive lugs 30 of the rotary face cup up are formed by molding on the outer periphery of the insert 14 and are fitted within the grooves 27 to transmit the rotary drive force of the rotary assembly to the split rotary face 16.

The drive lugs 30 also act as a cushioning or dampening device to accept any shock loading transmitted to or from the split rotary face, or ring 16.

The resilient insert, or rubber cup 14 is fitted under an inwardly facing shoulder 15 of the rotary body 12. The insert 14 has a generally inverted L-shaped cross section and has a first transverse part 26 which extends inwardly towards the rotary sleeve 50 in tight engagement with one side of the web 22. The second, perpendicularly extending part 24 is formed integrally with the first part 24 and is mounted in substantially perpendicular relationship to the web 22 of the rotary body 12. The opposite side of the insert 14 is fittingly engaged about one side of the split rotary face 16.

The outer radial surface of the insert 14 has a series of raised riblets 41 (see FIG. 3) of an overall greater diameter than that of the machined recess of the rotary housing 12, so as to provide a positive compressive static seal between the split seal, or insert 14 and the rotary body 12.

The insert 14 is securely bonded, for example vulcanized, onto the outer circumference of the split seal ring 16, so as to retain the fractured portions of the split ring 16 in a leak-proof manner. After vulcanization, the resilient insert 14 is cut or otherwise separated, entirely through its cross-section, at one cut line 17 which is directly adjacent to the seal ring 16 fracture line. The resilient insert 14 also has a second cut 19 not extending entirely through the cross-section of the insert 14 and located at a point adjacent to the second seal ring 16 fracture line, and diametrically opposite to the location, wherein the first cut 17 is performed.

The second cut line of the insert 14 acts as a hinge line, allowing the two semi-circular sections of the seal ring 16 to be opened at the fracture points and removed from the seal sleeve 50. After having been removed from the seal sleeve 50, the two halves of the seal ring, or rotary face 16 can be brought together, with the cup 14 hinging again at 19 to form a circle and causing the two halves of the split ring 16 to properly align themselves along the fracture lines.

The split ring 16 has a raised shoulder 47 which defines one side of a groove 34 which is designed to facilitate removal of the ring 16 from the rotary body 12, when required. A pry bar or a screw driver is inserted into the groove 34, pushing and separating the split ring 16 from the rotary body 12.

As was mentioned above, the rotary face, or ring 16 is fractured at two points, roughly dividing the circumference of the annular body 16 into two semi-circular portions. It was found that the fractured surfaces are less prone to leakage and, in practical applications, are virtually leak-proof, as opposed to smooth machined surfaces currently used in the art. Additional advantage of using the fractured ring lies in the fact that no bolts or other securing mechanisms need to be used to secure the portions of the split ring 16 together.

On reassembly, the insert 14 is coated with a suitable lubricant before it is pushed into the rotary seal housing 12 to insure that the elastomeric drive lugs 30 properly engage the mating notches 27 of the rotary body 12.

On the opposite side from the insert 14, the rotary body 12 is provided with a cutout 46 formed by an inwardly facing shoulder 40 and a side of the web 22. Fitted within the space 46 is a cone spring 44 which extends inwardly towards a shoulder 54 of the seal sleeve 50 and contacts the sleeve 50 with its innermost end. The cone spring 44 is generally oval in cross section and circular in lateral section.

An interior groove 56 is formed on the inner surface of the sleeve 50. Fitted within the groove 56 is a sealing O-ring 58 to ensure liquid-tight engagement between the sleeve 50 and the rotating shaft 66.

The stationary portion of the device of the present invention comprises a stationary wear ring, or face 60 which is also split in two halves. One side 62 of the stationary ring halves 60 contacts a contact face 36 of the rotational ring 16, while its opposite side 64 is fitted within a cutout 72 formed by a split flange 70.

Extending through the outer circumference of the stationary ring 60 is an annular groove 61 which receives an O-ring 63 therein. The O-ring 63 is a split-type O-ring, with a ball and socket type joint of the split circumference. The two halves of the fractured stationary face 60 are mounted around the seal sleeve 50, with the O-ring 63 keeping the halves together.

The split flange 70 is formed by a first part and a second part which are secured together by a pair of cross bolts 74 (only one is shown) inserted in respective sockets, or apertures 76 formed in the body of the flange half 70. Provision of the two parts of the split flange allows exertion of uniform radial compressive force on the stationary face O-ring 63. A pair of alignment pins 78 extend from a mating face 71 of the flange part 70, so as to engage within corresponding holes of the second part of the flange.

The screws 74 are of the type conventionally called socket head cap screws which, when engaged into a threadable hole of the second part of the flange, bring the two halves of the split flange together, applying a uniform radial compressive force on the stationary face O-ring 63.

Socket head cap screws 86 pass through over size hole in the setting plates 80 (only one shown for clarity) and engage in threaded holes in the extended axial portion 73 of the split flange 70. Tightening of the screws 86 causes the flat surface 82 of the setting plates 80, mounted on the exposed surface of the axial extension 73 of the split flange 70 to align themselves with the exposed flat face 73.

With the setting plates 80 in this position, and a portion 84 of the setting plates 80 engaged in the groove 51 of the seal sleeve 50, the seal sleeve 50 is then positioned such as to provide a compressive force on the inside diameter of the cone spring 44. These compressive forces are transmitted through the entire section of the cone spring 44, resulting in a compressive force applied to the rotary housing 12 and the split rotary seal ring 16.

The axial displacement of the seal sleeve 50 relative to the rotary assembly and the compressive force applied to the split seal faces through the rotary body 12 allows "seal preloading" by applying a closing force which allows to form a positive seal at the interface between the rotary and stationary portions during static and dynamic operation of the seal device 10.

It should also be noted that the fluid hydraulics within the pump casing 100, or other vessel provide a positive sealing force (closing) or a negative sealing force (opening) under different circumstances.

Figure 2:
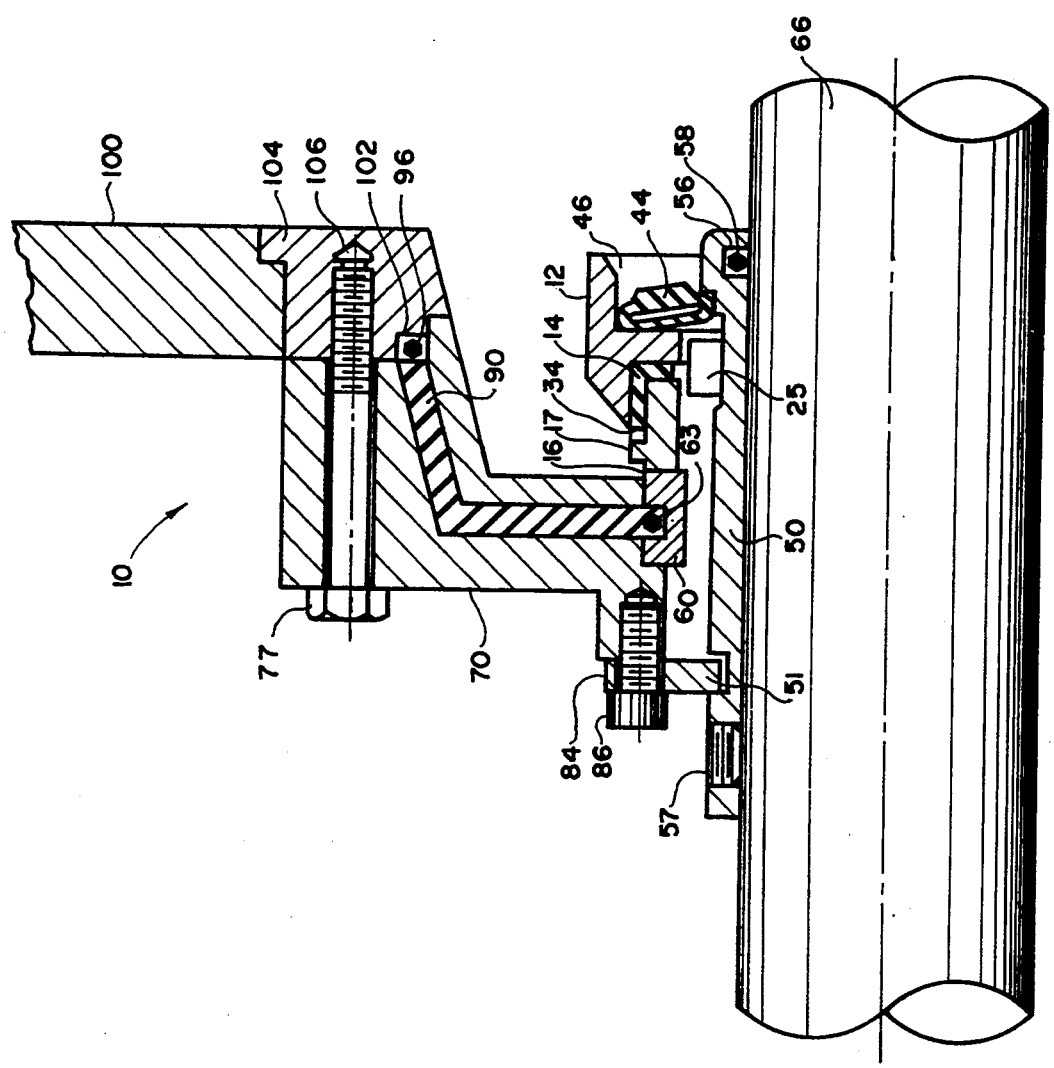
FIG. 2 is a cross-sectional, detail view of the seal ring seal of the present invention.

A stationary elastomeric flange seal 90 is fitted within a rectangular, in cross section, groove 75 of the flange 70 and has an innermost end 92 which slightly extends into the groove 61 formed in the stationary face 60, slightly compressing the O-ring 63. The opposite, outer end 94 of the seal 90 compresses a split flange O-ring 96 which is fitted on a shoulder location at the outer end of the cutout, or groove 75 of the flange 70. A part of the O-ring 96 fits within an annular groove 102 of an adaptor 104. The adaptor 104 is optional, it fits with the vessel casing 100, as shown in FIG. 2.

The objective of using the static (stationary) seal 90 is to allow for deflections of the two halves of the flange 70 caused by joining them to the vessel casing 100. If the casing 100 is slightly misaligned, the seal 90 allows a small degree of flexibility to accommodate the missalignment and prevent possible fluid leaks between the two halves of the split flange. The O-ring 96 provides also a fluid seal between the split flange 70 and the adaptor 104.

The sleeve 50 is secured on the rotary shaft 66 by a set of screws 57 (only one is shown) fitted within internally threaded apertures 59 formed in the sleeve 50.

The flange 70 is removably attached to the adaptor 104 by a plurality (for example, four) bolts 77 passing through apertures 79 of the flange 70 to be received in co-aligned internally threaded openings 106 formed in the adaptor body 104.

As will be appreciated, the split stationary ring 60 is subject to friction and wear when engaging the face 36 of the split ring 16. When the wear of the ring 60 is considerable, it has to be changed and substituted by a new, undamaged ring. To facilitate removal of the stationary ring 60, the ring is fractured along uneven lines similar to the seal ring 16.

When it becomes necessary to change the wear ring 60 and the split ring 16, which is likewise exposed to friction and wear, the bolts 77 which connect the split flange 70 to the vessel casing 100 are removed and the cross bolts 74 which hold the two halves of the split flange together are removed. The two halves are separated and moved away from the engagement with the split stationary face 60 and the seal sleeve 50. The split O-ring 63 is separated, allowing for the removal of both halves of the face 60 from the rotating shaft 66 and the seal sleeve 50. The rotary face 36 then becomes exposed, which allows to put a screw driver or a pry bar into the face removal groove 34 formed in the split ring 16 and push against body 12, with the forward face of the rotary body 12 acting as a fulcrum point. The split rotary ring 16 and the insert 14 are then withdrawn from the rotary housing 12 and the rotary face 16 can be changed, as required.

Sometimes it is necessary to also change the static seal 90 which is positioned in the stationary flange 70. This can be also done while the two halves of the stationary flange 70 are separated. Assembly of the split ring seal and re-assembly with the vessel housing 100 is made in the reverse order.

The materials from which the split ring 16 can be manufactured can be selected from carbon, alumina ceramic, tungsten carbide or silicon carbide. The stationary ring 60 can be formed from alumina ceramic, silicon carbide, or tungsten carbide while the resilient inserts and O-rings can be formed from various elastomeric materials. The lugs 30 are also formed from similar material having sufficient strength to withstand compression forces imposed by the split ring 16, and resilient enough to absorb the shock of the initial, and continuing rotation, as well as any shock loadings applied during operation.

The setting plate screws 86 can be two or three in number, while the flange 70 retaining screws 77 can be three or four in number. It was observed that the use of two flange connecting bolts 74 is sufficient to retain the two halves of the flange 70 together.

Many changes and modifications can be made within the design of the present invention without departing from the spirit thereof. I therefore pray that my rights to the present invention be limited only by the scope of the appended claims.

I claim:

1. A split seal device, comprising:

a rotary assembly comprising a rotary body having an annular lateral portion and a transverse integral web of a reduced diameter which is attached in substantially perpendicular relationship to a middle part of an inner wall of said outer portion, the rotary body defining a central opening sized and shaped to fit in circumferential relationship about a means for mounting the rotary body on a rotating shaft, said inner wall having a plurality of equidistantly spaced grooves;

a fractured seal ring co-axially mounted, at least in part, within said rotary body, said fractured split ring having a contact face for contacting a stationary seal, said contact face extending at a distance from an edge of said rotary body; and a split flexible elastomeric insert fixedly bonded to at least a part of an outer circumference of the fractured seal ring, said insert being provided with a plurality of equidistantly spaced flexible drive lugs integrally formed on an outer surface of the insert and engageable with corresponding grooves made in the inner wall of the rotary body for securely engaging said seal ring and said rotary body and for transmitting rotational force to the fractured seal ring, said insert being fittingly engaged between said rotary body and said fractured seal ring.

2. The device of claim 1, wherein said fractured seal ring is fractured along two diametrically opposite uneven fracture lines.

3. The device of claim 1, wherein said flexible insert is split along about at least one split line.

4. The device of claim 1, wherein said rotary body comprises a first, outer part extending in parallel relationship to the rotating shaft and a second, transverse part extending substantially perpendicularly to said rotating shaft, inwardly towards said rotating shaft.

5. The device of claim 1, wherein the flexible insert has an inverted L-shaped cross section and comprises a part which extends in co-alignment with the first part of the rotary body and a second part which extends in co-alignment with the second part of the rotary body.

6. The device of claim 1, wherein a removal groove is formed in an outer surface of the seal ring, one side of the groove being defined by an outwardly projecting shoulder of said split ring.

7. The device of claim 1, wherein said means for mounting said rotary body comprise an elongated cylindrical sleeve fixedly attached to said rotating shaft and drive keys carried by said sleeve and engageable with notches formed in the rotary body.

8. The device of claim 7, further comprising a compressive spring means for applying a compressive force on the rotary body, said spring means being mounted between said sleeve and said rotary body and fitted within a cutout formed in the rotary body on a side opposite said resilient insert.

9. A split seal device for use with a rotating body and a stationary body, comprising:

a rotational portion and a stationary portion, said rotational portion comprising a rotary body provided with means for mounting on a rotating shaft, said stationary portion comprising a stationary wear ring;

a fractured split ring co-axially mounted, at least in part, within said rotary body, said fractured split ring having a contact face for contacting the stationary portion in frictional engagement with a wear ring of the stationary portion, said wear ring and said fractured split ring each being fractured along two diametrically opposite uneven fracture lines; and a flexible elastomeric insert fixedly bonded to at least a part of an outer circumference of the fractured split ring and fittingly engaged between said rotary body and said fractured split ring, said insert carrying a plurality of equidistantly spaced flexible lugs integrally formed on an exterior thereof and engageable with corresponding grooves made in the rotary body for securedly connecting the fractured split ring to the rotary body and for transmitting torque to the fractured split ring, while dampening any shock loading transmitted to and from the fractured split ring.

10. The device of claim 8, wherein said flexible insert is split along at least one split line.

11. The device of claim 9, wherein said stationary portion comprises a flange means for attaching the device to a fluid containing vessel, said flange means having a first part, a second part detachably secured to the first part and an elastomeric seal means fittingly mounted between the first and the second part of the flange means.

12. The device of claim 9, wherein said wear ring is formed with an annular groove extending about outer circumference of the seal ring, and wherein a split O-ring seal is mounted within said groove to prevent leakage between said flange and said seal ring.

13. The device of claim 11, wherein said flange parts are fixedly attached to each other during operation.

14. The device of claim 9, wherein said fractured split ring is fractured along two diametrically opposite uneven fracture lines.

15. The device of claim 9, wherein said flexible insert is split along about at least one split line.

16. The device of claim 9, wherein said rotary body comprises a first, outer part extending in parallel relationship to the rotating shaft and provided with a plurality of equidistantly spaced grooves for receiving the drive lugs formed on the flexible insert, and a second, transverse part extending substantially perpendicularly to said first portion towards said rotating shaft, said second part being formed with a pair of diametrically opposite notches adapted for engagement with matching drive keys secured to said mounting means.

17. The device of claim 9, wherein the flexible insert has an inverted L-shaped cross section and comprises a part which extends in co-alignment with the first part of the rotary body and a second part which extends in co-alignment with the second part of the rotary body.

18. The device of claim 9, wherein a removal groove is formed in an outer surface of the split ring, one side of the groove being defined by an outwardly projecting shoulder of said split ring.

19. The device of claim 9, wherein said means for mounting said rotary body comprise an elongated cylindrical sleeve fixedly attached to said rotating shaft and drive keys carried by said sleeve and engageable with notches formed in the rotary body.

20. The device of claim 9, further comprising a compressive spring means for applying a compressive force on the rotary body, said spring means being mounted between said sleeve and said rotary body and fitted within a cutout formed in the rotary body on a side opposite said resilient insert.

21. The device of claim 20, wherein said stationary portion comprises a stationary wear ring, a flange means for attaching the device to a fluid containing vessel, said flange means comprising a pair of flange halves, said stationary portion further comprising an elastomeric flange seal mounted between said flange halves for accommodating possible misalignment of the flange halves, when joined together, and prevent fluid leakage between the flange halves.

22. The device of claim 21, wherein said sleeve is formed with an annular groove adjacent one of its ends, at least one drive key for engagement with the web of the rotary body and transmittal of the rotational force, and an upwardly extending shoulder adjacent an opposite end of the drive sleeve.

23. The device of claim 1, wherein said drive lugs are adapted for dampening a shock loading transmitted to and from said seal ring.

24. The device of claim 22, wherein said spring means abuts said outwardly extending shoulder of said drive sleeve.

25. A split seal device for use with a rotating body and a stationary body comprising:
a rotating drive sleeve adapted for co-axial mounting on at least a part of a rotating shaft, said drive sleeve being formed with an annular groove adjacent one of its ends, at least one drive key for transmitting rotational force to the rotary body and an outwardly extending shoulder adjacent an opposite end of the drive sleeve;
a rotational portion comprising a rotary body having an outer lateral part, which is provided with a plurality of equidistantly spaced grooves, and a transverse web, which is provided with at least one notch for frictional engagement with said at least one drive key of said drive sleeve, a fracture seal ring co-axially mounted, at least in part, within said lateral part of the rotary body and an elastomeric flexible insert fixedly bonded to at least a part of an outer circumference of the seal ring and fittingly engaged between said rotary body and said seal ring, said flexible insert being provided with a plurality of flexible lugs integrally formed on its outer circumference for frictional engagement within said grooves of said lateral part of the rotary body and transmittal of rotational force to said seal ring, said insert being further provided with a plurality of raised riblets for providing a positive compressive static seal between the flexible insert and the rotary body, said seal ring being formed with an upwardly raised shoulder defining a removal groove for facilitating removal of the seal ring from the rotary body, when required, said rotational portion further comprising an annular cone spring mounted between said drive sleeve and said rotary body and fitted within a cutout formed in the rotary body and abutting said outwardly extending shoulder of the drive sleeve, said cone spring applying a compressive force on the rotary body through substantially entire section of the cone spring;
a stationary portion, comprising a stationary wear ring, a flange means for attaching the device to a fluid containing vessel, said flange means comprising a pair of flange halves fixedly secured together and provided with an elastomeric flange seal mounted between said flange halves for accommodating possible misalignment of the flange halves, when joined together, and prevent fluid leakage between the flange halves, said stationary portion further comprising a plurality of setting plates, each setting plate being fixedly attached to a respective flange half, at least a portion of the setting plate being engageable in the annular groove of said drive sleeve, so as to provide compressive force on an inside diameter of said cone spring, said rotary body and said seal ring.

* * * * *